(12) United States Patent
Murphy

(10) Patent No.: US 12,339,789 B2
(45) Date of Patent: *Jun. 24, 2025

(54) MEMORY ACCESS DETERMINATION

(71) Applicant: Micron Technology, Inc., Boise, ID (US)

(72) Inventor: Richard C. Murphy, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/654,749

(22) Filed: May 3, 2024

(65) Prior Publication Data

US 2024/0289283 A1 Aug. 29, 2024

Related U.S. Application Data

(63) Continuation of application No. 17/164,142, filed on Feb. 1, 2021, now Pat. No. 11,977,495, which is a
(Continued)

(51) Int. Cl.
*G06F 12/14* (2006.01)
*G06F 9/455* (2018.01)

(52) U.S. Cl.
CPC ...... *G06F 12/1491* (2013.01); *G06F 9/45558* (2013.01); *G06F 2009/45583* (2013.01); *G06F 2212/657* (2013.01)

(58) Field of Classification Search
CPC ............. G06F 12/1491; G06F 12/0215; G06F 12/0842; G06F 12/0811; G06F 12/1441;
(Continued)

(56) References Cited

U.S. PATENT DOCUMENTS 6,745,307 B2 6/2004 McKee
6,854,039 B1 2/2005 Strongin et al.
(Continued)

FOREIGN PATENT DOCUMENTS

| EP | 1612638 | 3/2011 |
|----|---------|--------|
| JP | H052523 | 1/1993 |
| JP | 2004288155 | 10/2004 |

OTHER PUBLICATIONS

International Search Report and Written Opinion for related PCT Application No. PCT/US2019/029572, dated Aug. 6, 2019, 14 pages.
(Continued)

*Primary Examiner* — Hiep T Nguyen
(74) *Attorney, Agent, or Firm* — Brooks, Cameron & Huebsch, PLLC

(57) ABSTRACT

Apparatuses and methods related to computer memory access determination are described. A command can be received at a memory system (e.g., a system with or exploiting DRAM). The command can comprise a memory operation and a plurality of privilege bits. The privilege level or a memory address that is associated with the memory operation can be identified. The privilege level can correspond to the memory address can describe a privilege level that can access the memory address. A determination can be made as to whether the memory operation, or the application requesting certain data or prompting corresponding instructions, is entitled to access to the memory address using the plurality of privilege bits and the privilege level. Responsive to determining that the memory operation has access to the memory address, the memory operation can be processed.

20 Claims, 5 Drawing Sheets

Related U.S. Application Data continuation of application No. 16/010,174, filed on Jun. 15, 2018, now Pat. No. 10,909,046.

(58) Field of Classification Search
CPC ....... G06F 2212/1052; G06F 2212/657; G06F 9/45558; G06F 3/0623; G06F 3/0658; G06F 3/0679; G06F 13/1631
See application file for complete search history.

(56) References Cited

U.S. PATENT DOCUMENTS

| | | | |
|---|---|---|---|
| 7,487,367 | B2 | 2/2009 | Belnet et al. |
| 8,478,959 | B1 | 7/2013 | Wyatt |
| 8,656,106 | B2 | 2/2014 | Cox et al. |
| 10,909,046 | B2 * | 2/2021 | Murphy .............. G06F 12/0842 |
| 11,977,495 | B2 * | 5/2024 | Murphy .............. G06F 12/0842 |
| 2002/0078143 | A1 | 6/2002 | De Boor et al. |
| 2006/0020944 | A1 | 1/2006 | King et al. |
| 2006/0149918 | A1 | 7/2006 | Rudelic et al. |
| 2007/0056042 | A1 | 3/2007 | Qawami et al. |
| 2008/0163366 | A1 | 7/2008 | Chinya et al. |
| 2008/0189560 | A1 | 8/2008 | Case et al. |
| 2011/0153926 | A1 | 6/2011 | Fang et al. |
| 2011/0154443 | A1 | 6/2011 | Thakur et al. |
| 2012/0198192 | A1 | 8/2012 | Balasubramanian et al. |
| 2012/0216002 | A1 | 8/2012 | Moyer et al. |
| 2012/0311277 | A1 | 12/2012 | Chu et al. |
| 2013/0132695 | A1 | 5/2013 | Heo et al. |
| 2013/0290637 | A1 | 10/2013 | Turean et al. |
| 2013/0326193 | A1 | 12/2013 | McCarthy |
| 2014/0380468 | A1 | 12/2014 | Gerzon |
| 2015/0317259 | A1 | 11/2015 | Zbiciak et al. |
| 2015/0356029 | A1 | 12/2015 | Craske et al. |
| 2016/0147672 | A1 | 5/2016 | Atzmon et al. |
| 2017/0123800 | A1 | 5/2017 | Frazier et al. |
| 2017/0148501 | A1 | 5/2017 | Son et al. |
| 2017/0270287 | A1 | 9/2017 | DeHaan et al. |
| 2018/0039424 | A1 | 2/2018 | Cui et al. |
| 2018/0129620 | A1 | 5/2018 | Gittins |
| 2019/0318107 | A1 | 10/2019 | Capone |

OTHER PUBLICATIONS

Extended Search Report from related European Application No. 19818697.5, dated Feb. 10, 2022, 13 pages.

* cited by examiner

MEMORY ACCESS DETERMINATION

PRIORITY INFORMATION

This application is a Continuation of U.S. application Ser. No. 17/164,142, filed on Feb. 1, 2021, which is a Continuation of U.S. application Ser. No. 16/010,174, filed Jun. 15, 2018, which issued as U.S. Pat. No. 10,909,046 on Feb. 2, 2021, the contents of which are included herein by reference.

TECHNICAL FIELD

The present disclosure relates generally to memory, and more particularly, to apparatuses and methods associated with determining access privileges to memory.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. Non-volatile memory may be used in, for example, personal computers, portable memory sticks, digital cameras, cellular telephones, portable music players such as MP3 players, movie players, and other electronic devices. Memory cells can be arranged into arrays, with the arrays being used in memory devices.

Various computing systems include a number of processing resources that are coupled to memory (e.g., a memory system), which is accessed in association with executing a set of instructions (e.g., a program, applications, etc.). Computer architectural features may be exploited to access data stored in memory, often for nefarious purposes, irrespective of whether applications or programs seeking access to the data are entitled or expected to do so.

DETAILED DESCRIPTION

Figure 1A:
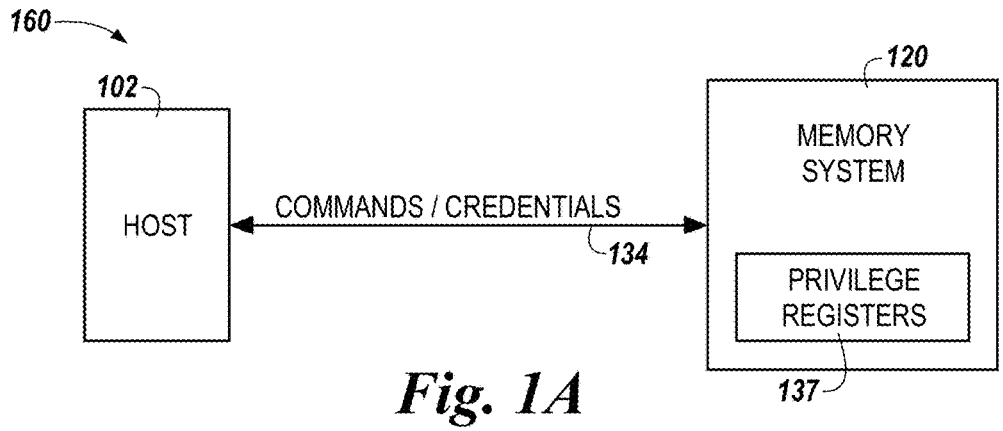
FIG. 1A is a block diagram of an apparatus in the form of a computing system including a memory system and capable of verifying memory access privileges in accordance with a number of embodiments of the present disclosure.

The present disclosure includes apparatuses and methods related to memory access verification. As described herein, memory architecture may be leveraged to avoid problems created when features of computer (e.g., central processing unit (CPU)) architectures are exploited for unprivileged accesses to data. A memory system can include privileged and non-privileged data. Privileged data is data that is protected via privileges while non-privileged data is not protected via privileges. Processing resources may access privileged data and non-privileged data. Processing resources may access privileged data and non-privileged data during speculative execution. As described herein, tools and techniques may be employed at or with a memory system to help control or limit access to privileged data.

An example method can include receiving a request comprising a memory command and a plurality of privilege bits and identifying a privilege level associated with a memory address corresponding to the memory command. The method can also include determining whether a memory operation corresponding to the memory command has access to the memory address using the plurality of privilege bits and the privilege level and, responsive to determining that the memory operation has access to the memory address, processing the memory operation.

Computing systems can utilize branch prediction and/or speculative execution to improve performance. Branch prediction is an approach to computer architecture that attempts to mitigate the costs of branching. As used herein, a branch is a possible execution stream of a conditional statement. A conditional statement can include one or more branches that can direct execution of a program to different streams based on the result of the conditional statement. A conditional statement can include, for example, an if-then-else statement or a case statement, among other types of conditional statements. A conditional statement can include a Boolean condition that can be used to select a branch for further execution.

In branch prediction, a processing resource can select a branch and execute the branch, where the branch is dependent on an operation being executed. For example, the processing resource, while waiting for an operation (e.g., read operation) to complete, can select a branch and process commands corresponding to the branch. Upon completing the operation, the processing resource can either discard the predicted branch or commit the speculative computations associated with the predicted branch.

Speculation, which may be referred to as speculative execution or speculative computation, is an optimization technique in which a processing resource performs a command that is not currently needed. The execution of the command is performed before it is known whether it is actually needed so as to prevent a delay that would have to be incurred by performing the command after it is known that it is needed. For example, after a branch is predicted as the most likely branch to be selected, speculative computing can include execution tasks that are derived from the selection of a branch. Speculative computing refers to an out-of-order execution of instructions (e.g., command/operations). As used herein, a processing resource can issue commands to a memory resource. A memory resource can process the commands and perform memory operations corresponding to the commands.

In various instances, speculative execution can lead to security vulnerabilities. For example, speculative execution can provide opportunities for un-privileged entities (e.g., users) to access privileged data. As used herein, privileged data refers to data that is protected via a particular privilege level and is designed to be inaccessible to entities (e.g., un-privileged users) not granted permission to access data having the particular privilege level. Speculative computations can provide opportunities for un-privileged entities to access privileged data through indirect channels, or "side channels," by moving the privileged data to cache without verifying privilege levels used to access the privileged data.

Computations performed by physical devices can leave observable side effects beyond the computation's nominal outputs. Side channel attacks exploit the side effects to extract otherwise unavailable privileged data. For example, branch prediction and speculative computations can include moving privileged data to cache and/or registers available to a processing resource. Discarding the prediction may not include discarding (e.g., clearing) data stored in the cache. A side channel attack can include accessing the privileged data stored in the cache.

Two examples of side channel attacks that utilize the vulnerabilities of branch prediction and speculative execution include a type of attack known as Meltdown and a type of attach known as Spectre. A Meltdown attack is a side channel attack that enables data values to be discerned from cache misses. A Spectre attack allows for speculative execution of instructions to perform privileged operations that leak information. While the vulnerabilities exploited in both attacks can be eventually identified and resolved, the attacks execute instructions to access privileged information.

The Meltdown type of attack relies on speculative execution to reveal the content of a memory location (e.g., address). Processing resources can map the kernel into the user's address space to facilitate faster traps and access. However, the processing resources may not have permission to access (e.g., operate on) the kernel address space. A processing resource may be capable of issuing an otherwise un-privileged (e.g., illegal) memory command while verifying a branch to be selected. In reverting the illegal memory operation(s) corresponding to the memory command, a processing resource may issue or return (e.g., throw) an exception. The malicious code, through the processing resource, may allow access to privileged data by suppressing the exception and determining which array cache line is currently in the cache.

A Spectre type of attack can exploit speculative execution and miss-train a processing resource's branch target buffer (BTB). A BTB is a portion of a processing resource that predicts the target of a taken conditional branch or an unconditional branch instruction before the target of the branch instruction is computed by the execution unit of the processing resource. Once again, in the Spectre type of attack, the processing resource can be configured to place privileged data in the cache, which can then be extracted from the cache by an un-privileged entity.

A number of different approaches can be used to resolve the vulnerabilities associated with branch prediction and speculative execution. For example, branch prediction and/or speculative execution can be disabled or rules can be provided to prevent speculation across page faults. However, both options limit the ability to perform branch predictions and speculative executions which can provide a significant performance impact to systems.

In a number of embodiments, privileges can be enforced at a memory device to determine whether a memory operation is to be performed. The privileges can be enforced, for example, using various embodiments described herein.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure. As used herein, the designator "N" indicates that a number of the particular feature so designated can be included with a number of embodiments of the present disclosure.

As used herein, "a number of" something can refer to one or more of such things. For example, a number of memory devices can refer to one or more of memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1A is a block diagram of an apparatus in the form of a computing system 160 including a memory system 120 and capable of verifying memory access privileges in accordance with a number of embodiments of the present disclosure. As used herein, an "apparatus" can refer to, but is not limited to, a variety of structures or combinations of structures, such as a circuit or circuitry, a die or dice, a module or modules, a device or devices, or a system or systems. For example, a host 102 and/or the memory system 120 may separately be referred to as an "apparatus."

The memory system 120 can comprise multiple channels each having a number of devices (e.g., chips, dies, etc.) corresponding thereto. Each of the devices can comprise multiple banks (e.g., of memory cells). Although not shown in FIG. 1A, the memory system 120 can include a controller, which can service a number of memory channels. Alternatively, the controller may be implemented as multiple separate controllers (e.g., one for each of multiple channels). For example, the memory system 120 can comprise a plurality of modules (e.g., dual in-line memory modules (DIMMs)).

The host 102 can communicate with the memory system 120 (e.g., via the controller) over a suitable interface. The computing system 160 can be a laptop computer, personal computer, digital camera, digital recording and playback device, mobile telephone, PDA, memory card reader, interface hub, sensor, Internet-of-Things (IoT) enabled device, among other systems, and the host 102 can include a number of processing resources (e.g., one or more processors) capable of accessing the memory system 120 (e.g., via a controller). The host 102 may be responsible for execution of an operating system (OS) and/or various applications that can be loaded thereto (e.g., from memory system 120).

The controller may receive memory access requests (e.g., in the form of read and write commands, which may be referred to as load and store commands, respectively) from the host 102. The controller can transfer commands and/or data between the host 102 and the memory system 120 over one or more interfaces, which can comprise physical interfaces such as buses, for example, employing a suitable protocol. Such protocol may be custom or proprietary, or one or more interfaces may employ a standardized protocol, such as DDR4, DDR5, HMC, HBM, (or a similar/subsequent memory interface standards), Peripheral Component Interconnect Express (PCIe), Gen-Z, CCIX, DDR based synchronous memory protocols, or the like.

As an example, interfaces may comprise combined address, commands, and data buses or separate buses for respective address, command, and data signals. The controller can comprise control circuitry, in the form of hardware, firmware, or software, or any combination of the three. As an example, the controller can comprise a state machine, a sequencer, and/or some other type of control circuitry, which may be implemented in the form of an application specific integrated circuit (ASIC) coupled to a printed circuit board. In a number of embodiments, the controller may be co-located with the host 102 (e.g., in a system-on-chip (SOC) configuration). Also, the controller may be co-located with the memory system 120.

The memory system 120 can include a number of memory devices. The memory devices can comprise a number of physical memory "chips," or dice which can each include a number of arrays (e.g., banks) of memory cells and corresponding support circuitry (e.g., address circuitry, I/O circuitry, control circuitry, read/write circuitry, etc.) associated with accessing the array(s) (e.g., to read data from the arrays and write data to the arrays). As an example, the memory devices can include a number of DRAM devices, SRAM devices, PCRAM devices, RRAM devices, FeRAM, phase-change memory, 3DXP, and/or Flash memory devices. In a number of embodiments, the memory system 120 can serve as main memory for the computing system.

The host 102 can provide commands 134 and/or credentials to the memory system 120. Commands 134 may include address information. In some examples, host 102 transmits signaling that includes memory commands and memory address information via a command/address bus, and the memory commands and memory address information are received at respective or corresponding pins of the memory system 120. Systems operating according to a double-data rate protocol specification (e.g., DDR4, DDR5, etc.) may employ such schemes. The credentials can include privilege bits that define a privilege level of the commands 134 and/or corresponding operations. The commands 134 can have corresponding memory operations to be executed in the memory system 120. A command provided from the host 102 to the memory system 120 can include the privilege level. The privilege level can describe a privilege level of an application and/or thread that provides the commands 134 through the host 102. As used herein, an application can describe computer-readable instructions that can be executed to perform coordinated functions, tasks, and/or activities. A thread can describe values for registers corresponding to a processing resource. The values stored in the registers can be used to control the execution of one or more applications or portions of the one or more applications. The functions, tasks, and/or activities can be performed using memory operations corresponding to the memory commands 134 to read and/or write data to the memory. For example, the functions, tasks, and/or activities can include read operations and/or write operations, among other operations corresponding to the commands 134 such as logical operations to be performed in the memory system 120 using data stored in the memory system. The privilege level can be described using a number of privilege bits.

The privilege bits can be provided with each command provided to the memory system 120. For example, the host 102 can be configured to generate and provide the privilege bits with each memory command 134. In some examples, the privileged bits can be integrated with a memory operation provided through the memory commands 134. For examples, the privileged bits can be provided using pins corresponding to the pins used to provide the memory commands. The privilege bits can be independent of the memory commands 134. For example, the privilege bits can be provided separately from the command 134. The privilege bits can be provided using pins not corresponding to the pins used to provide the command.

The memory system 120 can also be configured to receive the privilege bits and the memory operation. The privilege bits and the memory operation can be received in the form of a request and/or command 134. For example, the memory command 134 can comprise a memory operation and/or the privilege bits. In other examples, the memory operations can be selected/generated based on the received commands 134. The commands 134 can include a memory address associated with the memory operation. For example, if the memory command 134 is a read command and the corresponding memory operation is a read operation, then the memory address can be a base address that is to be read. The memory operation can also include a plurality of memory addresses associated with the memory operation. The plurality of memory addresses can define a range of memory addresses to be read or written to. The plurality of memory addresses can be continuous (e.g., consecutive) addresses and/or discontinuous addresses. In some examples, a plurality of memory addresses can be provided with a single memory operation and/or command 134 to request that the memory operation be repeated separately using each of the plurality of memory addresses. For example, if two memory addresses are provided with the memory operation, then the memory operation can be performed a first time at the first memory address and a second time at the second memory address.

A privilege level can be identified for the memory address(es) provided with the memory commands 134. The privilege level can indicate a privilege level that is needed to access the memory address. The privilege level associated with the memory address can be compared to the privilege bits associated with the memory operation to determine whether the memory operation has an appropriate privilege level required to access the memory address. For example, the privilege bits corresponding with the memory operation can be a first number of privilege bits and the privilege levels corresponding with the memory address can be used to generate a second number of privilege bits. The first number of privilege bits can be compared to the second number of privilege bits. The memory operation can be performed responsive to determining that the first number of privilege bits match the second number of the privilege bits. For instance, the memory operation can be performed responsive to determining that the memory operation has access to the memory address. The memory operation can have access to the memory address if the first number of privilege bits match the second number of privilege bits. In various instances, the memory operations are prevented from being performed responsive to determining that the first number of privilege bits do not match the second number of privilege bits.

In some embodiments, the memory system 120, through memory access verification logic, can generate an exception responsive to determining that the memory operation does not have access to the memory address (e.g., due to an insufficient privilege level). This may be referred to as "throwing an exception," and can suspend the execution of one or more memory operations. As used herein, exceptions can indicate error conditions or states arising from abnormal program control flows. That is, the exception can interrupt the flow of execution of one or more of the memory operations. The host 102, through the processing resource, can execute a pre-registered exception handler responsive to generating and/or receiving the exception. In some examples, a processing resource of the memory system 120 can generate the exception and can execute an exception handler. A processing resource of the host 102 can receive the exception and can execute an exception handler.

The exception can be thrown and handled, for example, before data is moved from the memory system 120 to the host 102. For instance, the exception can prevent data from being moved from the memory system to a cache corresponding to the host 102.

In some examples, the memory system 120 can interrupt the execution of the memory operations by providing predetermined data which is different from the privileged data which is being accessed by the memory operations. For example, the memory system 120 can provide a data pattern including all "zeros" and/or all "ones" responsive to determining that the privilege bits provided with the memory operation do not correspond to the privilege level corresponding to the memory address. Providing the data pattern can allow an execution stream associated with the memory operations to continue without providing privileged data.

The privilege level associated with the privileged data stored in the memory system 120 can be stored as privileged bits in privilege registers 137 and/or in a memory device (e.g., array of memory cells) of the memory system 120. In some examples, the privilege level can be derived from the memory address provided with the memory commands 134. For example, the memory system 120 can be configured to identify addresses as being privileged and a level of privilege without accessing bits from privilege registers 137 and/or memory devices. For example, the memory system 120 can generate privilege bits from the memory address.

The data pattern can identify that the memory operation does not have access to the memory address. For example, the processing resource can be configured to determine whether the memory operation has access to the memory address by analyzing the data provided by the memory system 120. The processing resource can identify faults and/or metadata from the data provided by the memory system 120 based on the data pattern provided by the memory system 120. For example, a first data pattern can describe the memory operation as not having access to a range of addresses while a second data pattern can describe the memory operation as not having access to a portion of the range of addresses but not the entire range of addresses. The examples described herein are not to be limited by the type of pattern and/or the metadata that can be associated with the type of data pattern.

A command 134 (e.g., request) comprising the memory operation and/or the permission bits can be part of a predicted branch and can be speculative. For example, a BTB can predict a branch and the processing resource can select speculative memory operations and/or memory commands 134 corresponding to the branch. The processing resource can generate a request comprising the memory operations and default privilege bits. The default privilege bits can be a lowest privilege level and/or can correspond to a thread being executed by the processing resource. The memory system 120 can determine whether the memory operations have access to a memory address using the default privilege bits as described above.

Figure 1B:
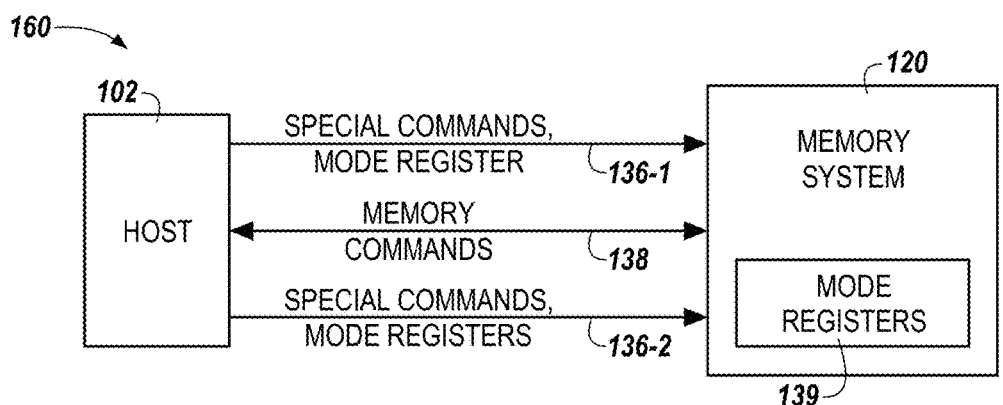
FIG. 1B is a block diagram of an apparatus in the form of a computing system including a memory system and capable of verifying memory access privileges in accordance with a number of embodiments of the present disclosure.

FIG. 1B is a block diagram of an apparatus in the form of a computing system including a memory system and capable of verifying memory access privileges in accordance with a number of embodiments of the present disclosure. In the example of FIG. 1B, the privilege level associated with the commands 138 can be provided in a separate message and/or a special command 136-1.

The special command 136-1 can be a message provided from the host 102 to the memory system 120 that defines a privilege level for a number of memory commands 138 which are provided separately from the special command 136-1. The special commands 136-1 can provide a privilege level to be stored in a mode register (e.g., mode registers 139) of the memory system 120. The privilege level can be reset using the special commands 136-2. The special commands 136-2 can also be provided from the host 102 to the memory system 120. The memory system 120 can reset the mode registers 139 of the system 120 responsive to receiving the special commands 136-2.

Upon receipt of the special commands 136-1, the memory system 120, through the memory access verification logic, can extract privilege bits provided with the special commands 136-1. The privilege bits can identify a privilege level of any memory commands that follow the special commands 136-1, for example. The memory system 120 can store the privilege bits in the mode register 139 of the memory system 120. The mode registers 139 can define a privilege mode that can be used to identify a privilege level of the memory commends 138.

The memory system 120 can include multiple mode registers 139 that may be separate or integrated. For example, the memory system 120 can include a plurality of continuous registers (e.g., mode registers 139) that is divided into portions providing mode registers corresponding to specific threads and/or processing resources. The memory system 120 can also include a plurality of mode registers 139 that are not continuous where each of the plurality of mode registers 139 correspond to one or more of the threads and/or processing resources. The memory system 120 can utilize the plurality of mode registers 139 to store a privilege mode, in the form of privilege bits, for a plurality of different threads and/or processing resources. For example, the memory system 120 can store a first privilege mode in a first privilege register corresponding to a first thread and/or processing resource and the memory system 120 can store a second privilege mode in a second privilege register corresponding to a second thread and/or processing resource. Doing so, in some examples, allows the memory system 120 to track privilege modes for different threads and/or processing resources and allows the memory system 120 to implement privilege-based restrictions to the access of memory resources corresponding to different privilege modes.

Implementing privilege modes corresponding to different threads and/or processing resources can include identifying a privilege mode using thread IDs and/or processing resource IDs or determining that a privilege mode does not exists for a corresponding thread ID and/or processing ID. In such examples, the special commands 136-1 can include a privilege mode and an identification (ID). The privilege modes can be stored in the mode registers 139 utilizing the ID. For example, a first ID and a first privilege mode can be stored in a first mode register and a second ID and a second privilege mode can be stored in a second mode register.

In some embodiments, the mode registers 139 can be associated with different IDs. For example, a first mode register can store a privilege mode corresponding to a first ID (e.g., thread ID and/or processing resource ID) while a second mode register can store a privilege mode corresponding to a second ID. Associating the mode registers 139 with the IDs can reduce the amount of data stored by removing the need to store an ID corresponding to the privilege mode. For example, a first mode registers can store privilege modes corresponding to a first ID without storing the first ID and a second mode register can store privilege modes corresponding to a second ID without storing the second ID. Although, the privilege modes and the IDs are described as being stored in the mode registers 139, the privilege modes and the IDs can also be stored in memory resources of the memory system 120 such as a memory device.

Responsive to receiving a memory command 138 comprising a memory operation and in some examples an ID, the memory system 120 can determine whether to process the memory command 138 utilizing a stored privilege mode. For example, the memory system 120 can retrieve a privilege mode from the mode registers 139 responsive to receiving the memory command 138. The privilege mode retrieved can correspond to the memory command 138. For example, if multiple privilege modes are stored in the mode registers 139, then the memory system 120 can utilize an ID provided with the memory command 138 to retrieve the privilege mode. If a single privilege mode is stored in the mode registers 139, then the memory system 120 can retrieve the privilege mode without utilizing an ID.

The memory system 120 can compare the privilege mode received from the host 102 with a privilege mode corresponding to a memory address. If the privilege mode corresponding to the memory commands 138 identifies a same privilege level as a privilege level identified by the privilege mode corresponding to the memory address, then the memory system can process the memory commands by processing the corresponding the memory operation provided with the memory command 138. If the privilege mode corresponding to the memory commands 138 does not identify a same privilege level as a privilege level identified by the privilege mode corresponding to the memory address, then the memory system 120 can refrain from processing the memory operations provided with the memory commands 138.

The memory system 120 can utilize the privilege mode received through the special commands 136-1 to verify a privilege level of a plurality of privilege commands 138. Communicating the privilege mode through the special commands 136-1 provides the ability to communicate the privilege mode without changing a communication protocol between the host 102 and the memory system 120. That is, an application, and not the host 102, being executed in a thread and by a processing resource of the host 102 can be responsible for providing the privilege level through the special commands 136-1.

The mode registers 139 can be reset using the special commands 136-2. For example, upon providing the memory commands 138 that utilize privilege modes, an application can provide, through the host 102, the special command 136-2 to reset the privilege level of future memory commands that are provided from the host 102.

For example, the special commands 136-2 can include a number of bits that represent a privilege mode. In some examples, the special commands 136-2 can include a first number of bits that represent the privilege mode and a second number of bits that represent an ID (e.g., thread ID and/or processor ID) corresponding to the privilege mode.

In some examples, the mode registers 139 can be reset without receiving the special commands 136-2. For example, the memory system 120 can reset the mode registers 139 after a predetermined duration of time has passed since the host 102 provided a memory command 138. In some examples, the memory system 120 can reset the mode registers 139 after a predetermined duration of time has passed since the host 102 provided a memory command 138 having an ID corresponding to the mode registers 139.

In some embodiments, the host 102, in performing branch prediction and/or speculation, can provide the memory commands 138 without providing the special commands 136-1. The special commands 136-1 may be part of the comparison operation and as such may not be executed if the memory commands 138 are generated before a comparison operation is completed. In such instances, the host 102 may provide the memory commands 138 and the memory system 120 may determine that the special commands 136-1 were not provided and/or may determine that there is not privilege mode set in the mode registers 139. The memory device 120 can utilize a default privilege mode if no privilege mode is identified in the mode registers 139 to determine whether the memory commands 138 have access to privileged data stored in a range of memory addresses included in the memory commands 138.

In some examples, the memory system 120 can access, from the mode registers 139, a first privilege level associated with the memory address provided in the memory commands 138. The memory system 120 can access a second privilege level associated with the request (e.g., special commands 136-1). The second privilege level can be accessed from a memory device, registers, and/or memory resource of the memory system 120. The second privilege level can be stored as a privilege mode but can be used as a privilege level. The memory system 120 can compare the first privilege level and the second privilege level to determine whether the memory operation, provided through the memory commands 138, has access to the memory address. The memory system 120 can perform the comparison utilizing the first privilege level and the second privilege level.

Responsive to determining that the memory operation has access to the memory address, the memory system 120 can process the memory operation to perform the memory operation. Responsive to determining that the memory operation does not have access to the memory address, the memory system 120 can refrain from processing the memory operation. The second privilege level can correspond to a privilege level of a thread that issued the memory commands 138, a processor that issued the memory commands 138, and/or an application that issued the memory commands 138. In some examples, the second privilege level associate with the memory commands 138 can be a privilege level of an operating system (OS), hypervisor, or privileged system application issuing the request.

Comparing the first privilege level to the second privilege level can include comparing a first number of privilege bits stored in the mode registers 139 to a second number of privilege bits stored in the memory system 120. Comparing the first privilege level to the second privilege level can further comprise determining whether the first privilege level is equal to the second privilege level. Responsive to determining that the first privilege level is equal to the second privilege level, the memory system 120 can determine that the memory operation has access to the memory address.

Figure 1C:
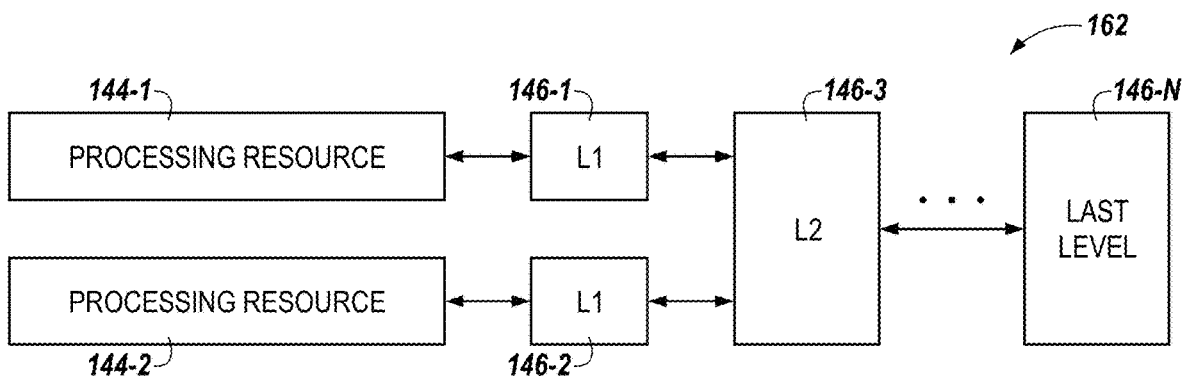
FIG. 1C is a block diagram of an apparatus in the form of a computing system including a cache system and capable of verifying memory access privileges in accordance with a number of embodiments of the present disclosure.

FIG. 1C is a block diagram of an apparatus in the form of a computing system including a cache system 162 and capable of verifying memory access privileges in accordance with a number of embodiments of the present disclosure. The cache system 162 comprises caches 146-1 to 146-N (e.g., level one cache, level 2 cache, . . . , last level cache), referred to as cache 146. FIG. 1C also includes processing resources 144-1 and 144-2, referred to as processing resources 144.

The cache system 162 can be a memory system. As such, the examples provided using the memory systems 120 in FIGS. 1A and 1B are applicable to the cache system 162. The cache system 162 can comprise hardware or software components that store data so that further requests for the data can be served faster. The caches 146-1 and 146-2 can comprise level one cache. The cache 146-1 can correspond to the processing resource 144-1 and the cache 146-2 can correspond to the processing resource 144-2. Each of the processing resources 144 can utilize their corresponding cache. For example, the processing resource 144-1 can utilize the cache 146-1 and not the cache 146-2 while the processing resource 144-2 can utilize the cache 146-2 and not the cache 146-1. The caches 146-2 to 146-N can be communal cache. That is, the caches 146-2 to 146-N can be utilized by both of the processing resources 144.

Data from the caches 146 can be moved between the caches 146 based on usage. For example, data that is accessed frequently can be stored in the cache 146 while data that is accessed less frequently can be stored in the cache 146-N.

The data can be copied from the memory systems 120 to the cache system 162. In some examples, the processing resources 144-1 and 144-2 can retrieve data from a memory system. The data retrieved from the memory system can be stored in the caches 146. As such, the caches 146 can comprise privileged data.

The privileged data can be stored in any of the caches 146. For example, the privileged data can be stored in the cache 146-1, the cache 146-2, the cache 146-3, . . . , and/or the cache 146-N. As such, access to any of the caches can be verified to determine if a memory operation has a privilege level sufficient to access data stored in the caches 146.

Figure 2:
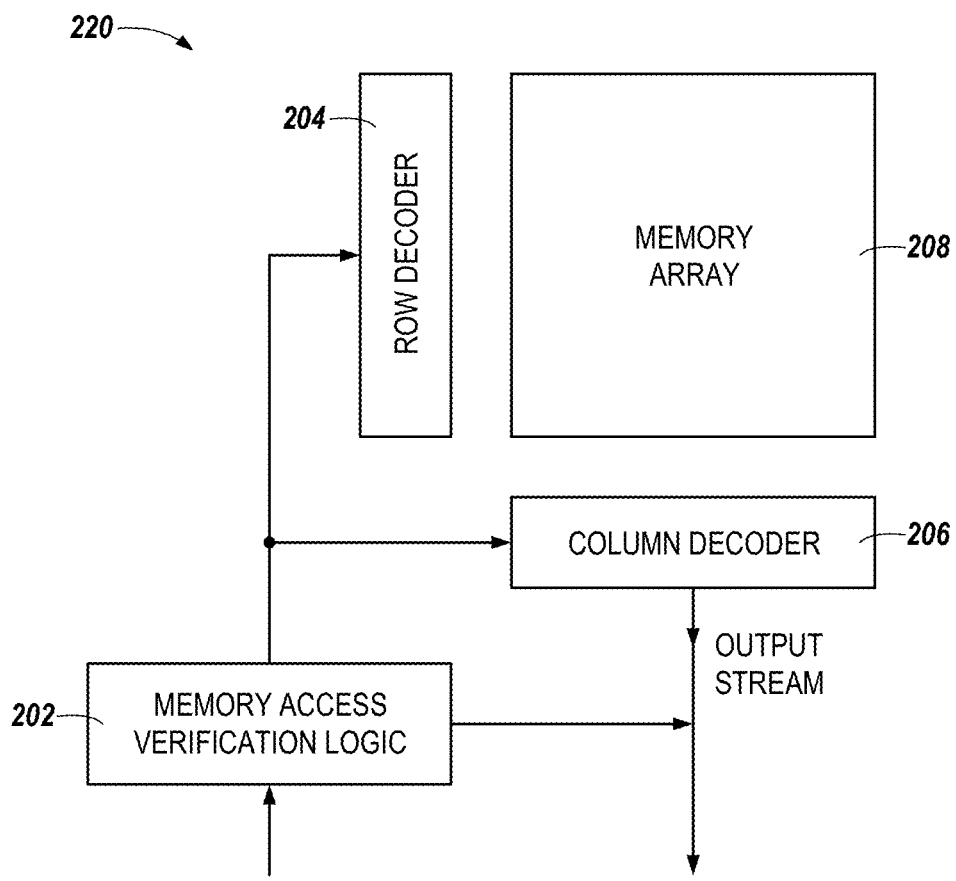
FIG. 2 is a block diagram of a memory system capable of verifying memory access privileges in accordance with a number of embodiments of the present disclosure.

The cache system 162 can include memory access verification logic as described in FIG. 2. The cache system 162 can verify memory access utilizing, for example, privilege bits provided with each memory operation and/or memory command as described in FIG. 1A. The cache system 162 can verify memory access utilizing, for example, privilege bits provided in a special command.

In some examples, access to data can include the movement of data from one of the caches 146 to a different one of the caches 146. For example, access can be verified if data is moved from the cache 146-N to the caches 146-1, 146-2, and/or 146-3. Data can also be verified if data is moved from the cache 146-1 to the caches 146-2, 146-3, and/or 146-N.

In some examples, the cache system 162 can receive a command at the memory access verification logic. The command can comprise a memory operation and a first privilege level. The command and/or the memory operation can comprise a plurality of addresses that the memory operation accesses. The first privilege level can be represented using privilege bits.

The cache system 162 can identify a second privilege level associated with the plurality of memory addresses of the cache, wherein the plurality of memory addresses is associated with the memory operation. The cache system 162 can determine, using the first privilege level and the second privilege level, whether the memory operation has access to the plurality of memory addresses. Responsive to determining that the memory operation has access to the plurality of memory addresses, the cache system 162 can process the memory operation to provide access to the plurality of memory addresses of the cache 146.

In some examples, the cache system 163 can determine whether the memory operation has access to the plurality of memory addresses using a hierarchy of privilege levels, the first privilege level, and the second privilege level. A hierarchy of privilege levels can define a plurality of privilege levels and the relationships between the plurality of privilege levels. For example, a hierarchy of permission levels can define that memory operations having a highest privilege level can have access to data having a lower privilege level and that memory operations having a lowest privilege level do not have access to data having a higher privilege level. As such, a hierarchy of privilege levels can prioritize privilege levels of memory operations and privilege levels of data. The hierarchy of privilege levels can also be applied to the examples of FIGS. 1A and 1B such that the memory systems 120 can implement the hierarchy of privilege levels to determine whether memory operations and/or memory commands have access to data.

The cache system 162 can determine whether the first privilege level has an equal privilege level or a higher privilege level than the second privilege level using the hierarchy of privilege levels. The cache system 162 can also determine whether the first privilege level has a lower privilege level than the second privilege level using the hierarchy of privilege levels.

The cache system 162 can determine that the memory operation has access to the plurality of memory addresses responsive to determining that the first privilege level has an equal privilege level or a higher privilege level than the second privilege level. The cache system 162 can also determine that the memory operation does not have access to the plurality of memory addresses responsive to determining that the first privilege level has a lower privilege level than the second privilege level.

The cache system 162 can also evaluate privilege utilizing the special commands 136-1 and the special commands 136-2 described in FIG. 1B. For example, the privilege levels of memory commands can be provided utilizing special commands such that a single privilege level can correspond to a plurality of memory commands including memory operations. A privilege level that is associated with a plurality of memory commands and/or memory operations can be described as a privilege mode. The cache 146 can store the privilege mode and/or the priority levels in a memory device or a memory system, in the cache 146, and/or in registers corresponding to the processing resources 144 and/or the cache system 162.

For example, the cache system 162 can receive a command (e.g., request) to perform a plurality of memory operations on the cache. The plurality of memory addresses of the cache that are associated with the plurality of memory operation can be identified. The first privilege level associated with the plurality of memory addresses can be accessed from the cache 146, the registers of the processing resource 144, and/or the registers of the cache system 162. The second privilege level associated with the request can be accessed. The second privilege level can be stored in the cache 146, the registers of processing resources 144, and/or the registers of the cache system 162.

The cache system 162 can determine whether the plurality of memory operations have access to the plurality of memory addresses using the first privilege level and the second privilege level. Responsive to determining that the plurality of memory operations have access to the plurality of memory addresses, the cache system 162 can process the plurality of memory operations to provide access to the plurality of memory addresses of the cache 146.

FIG. 2 is a block diagram of a memory system 220 capable of verifying memory access privileges in accordance with a number of embodiments of the present disclosure. The memory system 220 includes a memory access verification logic 202, a row decoder 204, a column decoder 206, and a memory page 208.

For clarity, the memory system 220 has been simplified to focus on features with particular relevance to the present disclosure. The memory array 208 can be a DRAM array, SRAM array, STT RAM array, PCRAM array, TRAM array, RRAM array, NAND flash array, and/or NOR flash array, for instance. The array 208 can comprise memory cells arranged in rows coupled by access lines (which may be referred to herein as word lines or select lines) and columns coupled by sense lines. Although a single array 208 is shown in FIG. 2, embodiments are not so limited. For instance, memory system 220 can include multiple memory devices each including a number of arrays 208 (e.g., a number of banks of DRAM cells).

The memory system 220 includes address circuitry to latch address signals provided over an I/O bus (e.g., a data bus) through I/O circuitry. Address signals are received and decoded by a row decoder 204 and a column decoder 206 to access the memory array 208. Data can be read from memory array 208 by sensing voltage and/or current changes on the data lines using sensing circuitry. The sensing circuitry can read and latch a page (e.g., row) of data from the memory array 206. The I/O circuitry can be used for bi-directional data communication with a host over the I/O bus.

A controller decodes signals provided by a control bus from a host. These signals can include chip enable signals, write enable signals, and address latch signals that are used to control operations performed on the memory array 208, including data read, data write, and data erase operations. In various embodiments, the controller is responsible for executing instructions from the host. The controller can be a state machine, a sequencer, or some other type of controller.

The memory access verification logic 202 can be coupled to the row decoder 204 and/or the column decoder 206 to perform the memory operations performed on the memory array 208. The memory access verification logic 202 can also be a state machine, a sequencer, or some other type of controller and may be referred to as a processing resource. The memory access verification logic 202 can verify access of data stored in the memory array 208. The memory access verification logic 202 can perform the examples described in FIGS. 1A to 1C.

When access is verified, the memory access verification logic 202 can process memory operations and/or memory commands by providing signals to the row decoder 204 and/or the column decoder 206 consistent with the memory commands. If access is not verified the memory access verification logic 202 can throw an exception and/or provided predetermined data through the output stream where the predetermined data is not the requested data.

In some examples, portions of the examples described in FIGS. 1A to 1C can be performed in the controller and/or memory access verification logic 202. For example, the controller can make a determination of whether access is granted and provide said determination to the memory access verification logic 202. The memory access verification logic can process the memory operation and/or throw the exception and/or provide predetermined data. Other divisions of the examples provide in FIGS. 1A to 1C can be implemented using a controller and/or the memory access verification logic 202.

Figure 3A:
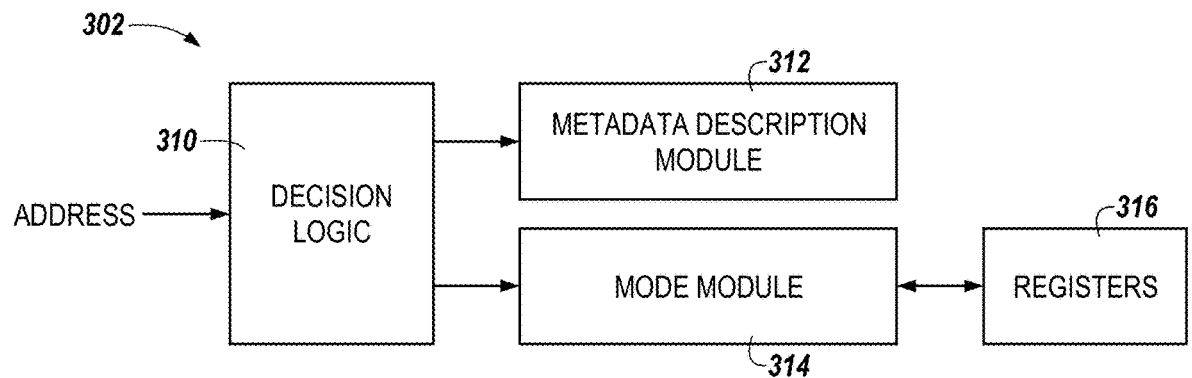
FIG. 3A is a block diagram of a memory access verification logic in accordance with a number of embodiments of the present disclosure.
Figure 3B:
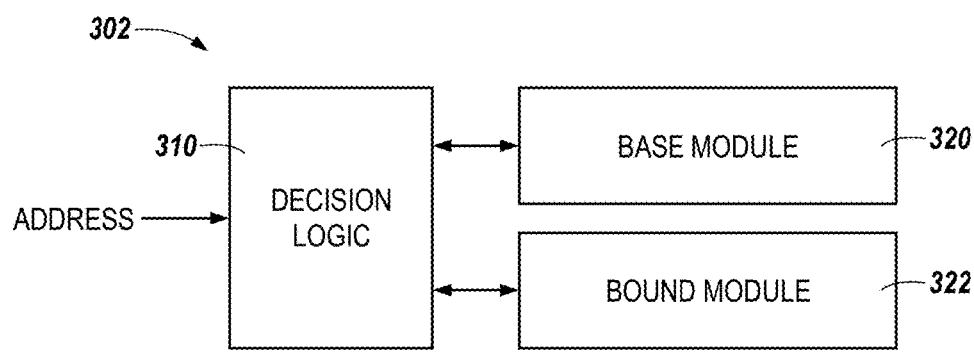
FIG. 3B is a block diagram of a memory access verification logic in accordance with a number of embodiments of the present disclosure.

The memory access verification logic 202 can include decision logic as described in FIGS. 3A and 3B. The decision logic can implement portions of the examples described in FIGS. 1A to 1C.

FIG. 3A is a block diagram of a memory access verification logic 302 in accordance with a number of embodiments of the present disclosure. The memory access verification logic 302 can include decision logic 310, meta data description module 312, current mode module 314, and registers 316.

The decision logic 310 can determine whether to grant access. For example, the decision logic 310 can receive an address. The decision logic 310 can access metadata associated with the address via the metadata description module 312. The metadata associated with the address can include, among other things, a privilege level associated with the address. The metadata description module 312 can access the metadata from registers and/or the memory array of a memory system.

The metadata can comprise a number of bits. For example, the metadata can comprise a single bit providing a privilege level. A 0-bit can represent a user privilege level and a 1-bit can represent a kernel privilege level. The metadata can also comprise more than a single bit. For example, the metadata can comprise a plurality of bits where a portion of the plurality of bits are privilege bits representing a privilege level or a privilege mode.

The decision logic 310 can also retrieve privilege bits associated with a memory operation utilizing a mode module 314. In some examples, the privilege bits can represent a privilege level. The privilege bits can also be considered a privilege mode. The mode module 314 can retrieve the privilege bits from the registers 316. The registers 316 can be privilege registers and/or mode registers.

The registers 316 can be local to a memory system or to a host. For example, if the decision logic 310 is implemented in the host, then the registers 316 can be local to a host. If the decision logic 310 is implemented in the memory system, then the registers 316 can be local to the memory system.

The decision logic 310 can compare the metadata to the privilege mode to determine whether to grant access to the address.

FIG. 3B is a block diagram of a memory access verification logic 302 in accordance with a number of embodiments of the present disclosure. In some examples, the memory access verification logic 302 can include the decision logic 310. The decision logic 310 can include a base module 320 and a bound module 322.

The decision logic 310 can determine whether an address received or a range of addresses received are protected. The decision logic 310 can utilize the base module 320 and the bound module 322 to determine whether an address is protected.

The decision logic 310 can request a base address from the base module 320. The base module 320 can store a single base address or multiple base addresses. The base module 320 can return the base address. The decision logic 310 can compare the address with the base address to determine whether the address is greater than or equal to the base address.

In some examples, the decision logic 310 can provide the address to the base module 320. The base module 320 can compare the address (e.g., address received by the decision logic 310) with one or more base addresses to determine whether the address is greater than or equal to one of the base addresses. The base module 320 can return the determination. If the base module 320 store multiple base addresses, then the base module 320 can return the determination and a base address. For example, the base module 320 can return a determination that the address is greater than or equal to the base address and can also return the base address.

The decision logic 310 can also determine whether the address is less than or equal to a bound address. For example, the decision logic 310 can request a bound address using a base address. The bound module 322 can receive the base address and can provide a corresponding bound address. In examples where the bound module 322 stores a single bound address, the bound module 322 can provide the bound address without receiving the base address. The bound module 322 can utilize the base address as an index to access a corresponding bound address. The decision logic 310 can compare the bound address received from the bound module 322 with the address to determine whether the address is less than or equal to the bound address.

In some examples, the decision logic 310 can provide the address and/or the base address to the bound module 322. The bound module 322 can compare the address to a bound address to determine whether the address is less than or equal to the bound address. The bound module 322 can provide the determination to the decision logic 310. The bound module 322 can utilize the base address to retrieve the bound address. For example, the bound module 322 can utilize the base address as an index to retrieve the bound address.

The decision logic 310 can determine whether the address is greater than or equal to a base address and less than or equal to the bound address to determine whether the address is protected. If the address is greater than or equal to the base address and is less than or equal to the bound address, then the address is protected. If the address is less than the base address or greater than the bound address, then the address is not protected.

In some examples, the decision logic 310 and/or the bound module 322 can also determine whether the address is less than or equal to the combination of the base address and a bound. The bound can be a bound size. The bound address can be generated from the base address and the bound. For example, the bound can be added to the base address to generate the bound address. The bound can be received from the bound module 322 and/or can be received with the base address and provided to the bound module 322. In some examples, the decision logic 310 can determine whether the address is greater than or equal to a base address and less than or equal to the combination of the base address and the bound (e.g., bound address) to determine whether the address is protected.

Figure 4:
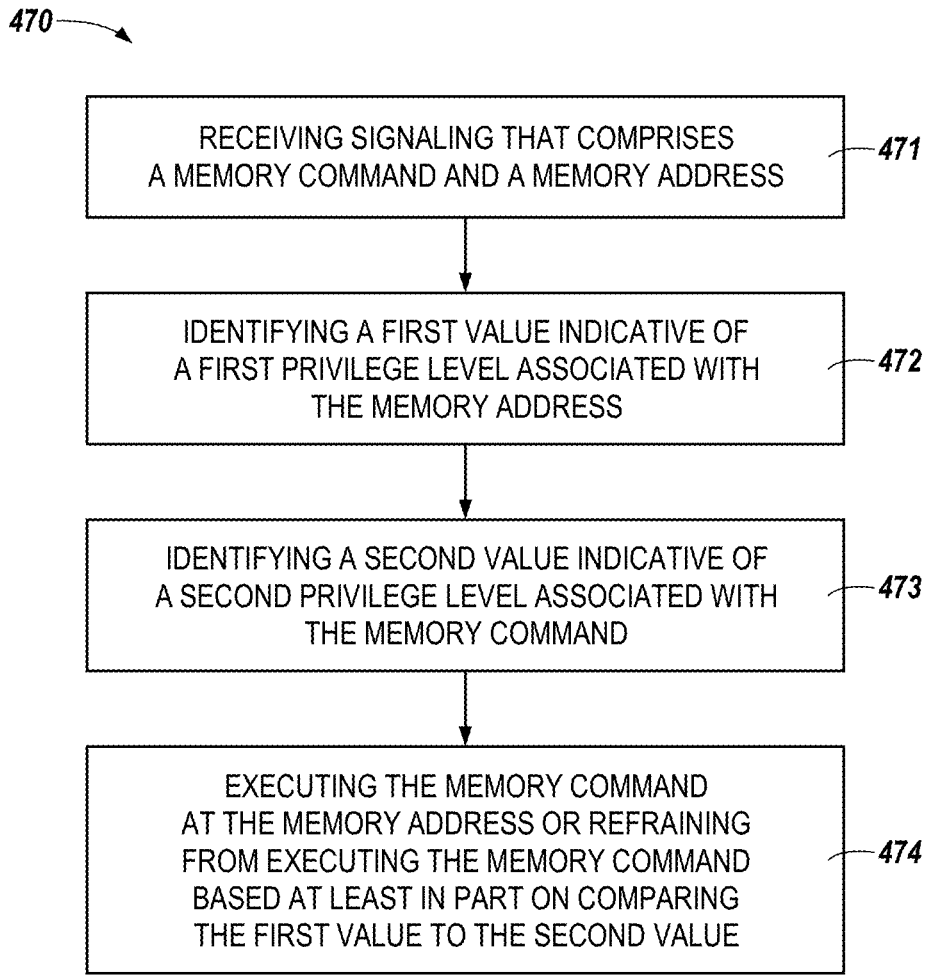
FIG. 4 illustrates an example flow diagram of a method for memory access verification consistent with the disclosure.

FIG. 4 illustrates an example flow diagram of a method for memory access verification consistent with the disclosure. A method stored as computer readable instructions can be executed by a processing resource. The processing resource can be incorporated in a host and/or a memory system. At block 471, the method 470 includes receiving signaling that comprises a memory command and a memory address. At block 472, the method 470 includes identifying a first value indicative of a first privilege level associated with the memory address. At block 473, the method 470 includes identifying a second value indicative of a second privilege level associated with the memory command. At block 474, the method 470 includes executing the memory command at the memory address or refraining from executing the memory command based at least in part on comparing the first value to the second value.

The method 470 can also include, responsive to determining that the memory operation does not have access to the memory address, refrain from processing the memory operation. The method 470 can also include, responsive to determining that the memory operations has access to the memory address, processing the memory operation.

The second privilege level associated with the memory command can be a privilege level of a thread that prompted the memory command for the memory address. In some examples, the second privilege level associated with the memory command is a privilege level of an application providing a request for data at the memory address. The second privilege level associated with the memory command can also be a privilege level of at least one of an operations system, hypervisor, or privileged system software that prompted the memory command for the memory address.

In some examples, comparing the first value to the second value can include determining that the first privilege level is equivalent to the second value, and wherein the memory command is executed at the memory address. In some examples, the first value and the second value can be equivalent even though the first value and the second value have different charges/voltages if the different charges/voltages represent a same value.

In some instances, identifying the second value indicative of the second privilege level comprises reading one or more registers from a plurality of registers. In other instances, identifying the second value indicative of the second privilege level comprises reading one or more cells of an array that comprises cells associated with the memory address of the receiving signaling.

Figure 5:
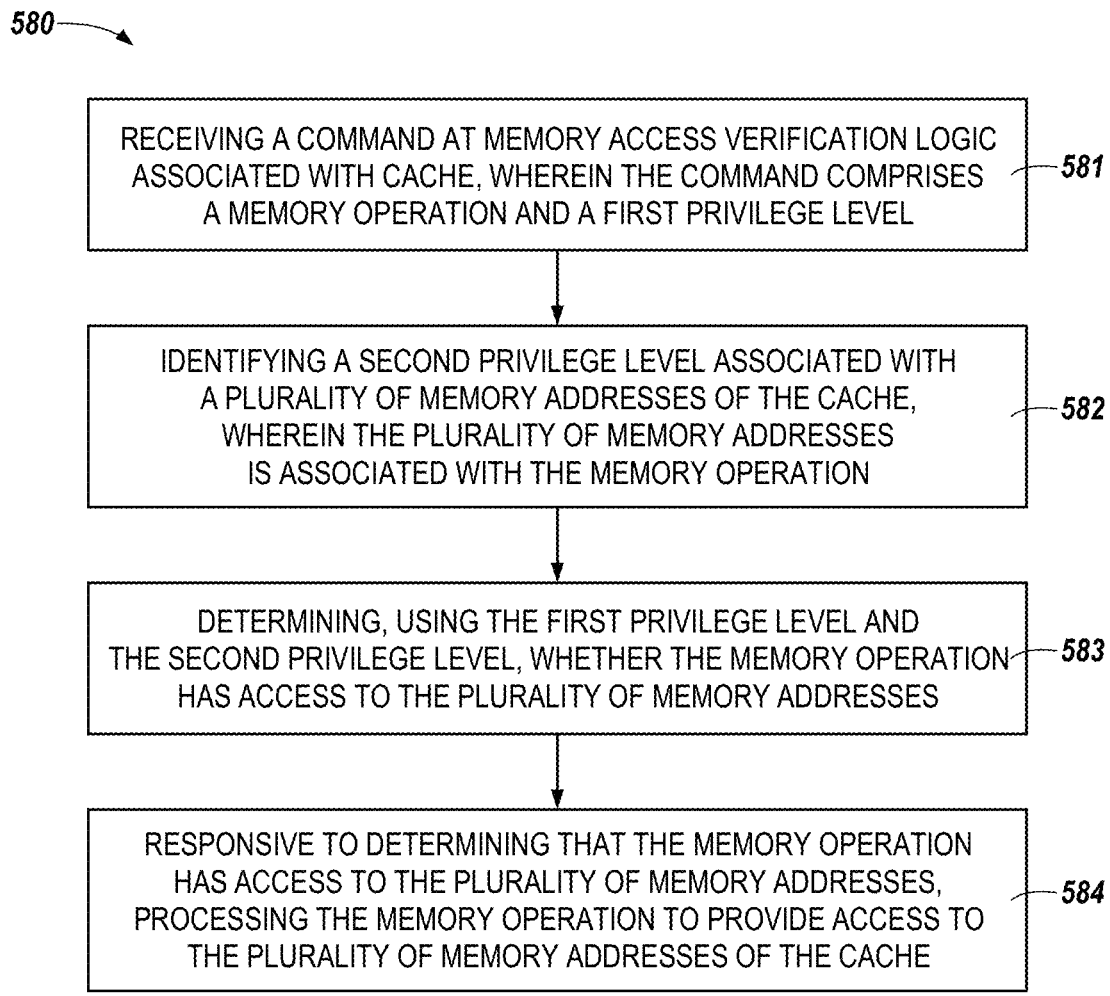
FIG. 5 illustrates an example flow diagram of a method for memory access verification consistent with the disclosure.

FIG. 5 illustrates an example flow diagram of a method for memory access verification consistent with the disclosure. At block 581, the method 580 includes receiving a command at memory access verification logic associated with cache, wherein the command comprises a memory operation and a first privilege level. At block 582, the method 580 includes identifying a second privilege level associated with a plurality of memory addresses of the cache, wherein the plurality of memory addresses is associated with the memory operation. At block 583, the method 580 includes determining, using the first privilege level and the second privilege level, whether the memory operation has access to the plurality of memory addresses. At block 584, the method 580 includes responsive to determining that the memory operation has access to the plurality of memory addresses, processing the memory operation to provide access to the plurality of memory addresses of the cache.

The method 580 can further comprise determining whether the memory operation has access to the plurality of memory addresses using a hierarchy of permission levels, the first privilege level, and the second privilege level. In some examples, determining whether the memory operation has access to the plurality of memory addresses further comprises determining whether the first privilege level has an equal privilege level or a higher privilege level than the second privilege level using the hierarchy of permission levels and determining whether the first privilege level has a lower privilege level than the second privilege level using the hierarchy of permission levels.

The method 580 can further comprise determining that the memory operation has access to the plurality of memory addresses responsive to determining that the first privilege level has an equal privilege level or a higher privilege level than the second privilege level. The method can also further comprise determining that the memory operation does not have access to the plurality of memory addresses responsive to determining that the first privilege level has a lower privilege level than the second privilege level.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method comprising:
    receiving signaling that comprises a memory command of a memory device and a memory address of the memory device;
    accessing, via metadata description logic, a first privilege level associated with the memory address from metadata associated with the memory address;
    retrieving, via a mode module, a second privilege level associated with the memory command;
    comparing the first privilege level to the second privilege level at decision logic of the memory device;
    generating a data pattern at an access verification logic of the memory device; and
    responsive to refraining from executing the memory command based on the comparing the first privilege level to the second privilege level, providing, via an output stream of a column decoder of the memory device, the data pattern to a host, wherein the data pattern identifies two or more types of faults corresponding to the comparing of the first privilege level and the second privilege level.

2. The method of claim 1, further comprising retrieving the second privilege level from a plurality of registers.

3. The method of claim 2, wherein the registers are local to the memory device.

4. The method of claim 1, wherein one of the two or more types of faults is a fault corresponding to memory commands not having access to a portion of the memory address.

5. The method of claim 4, wherein the fault further corresponds to the memory commands not having access to the portion of the memory address and having access to a different portion of the memory address.

6. The method of claim 1, further comprising sharing the output stream with the column decoder and the memory access verification logic and where the access verification logic provides the data pattern.

7. The method of claim 1, wherein responsive to determining that the memory operation does not have access to the memory address, refrain from processing the memory operation.

8. The method of claim 1, wherein the second privilege level associated with the memory command is a privilege level of a thread that prompted the memory command for the memory address.

9. The method of claim 1, wherein the second privilege level associated with the memory command is a privilege level of an application providing a request for data at the memory address.

10. An apparatus, comprising:
    a memory array; and
    memory access verification logic coupled to the memory array and incorporated in a memory device wherein the memory access verification logic includes decision logic, metadata description logic, and a mode module, and is configured to:
    retrieve, via the mode module, a first privilege level associated with a command comprising a memory operation;
    receive, at the decision logic, a memory address corresponding to the memory operation;
    access, at the metadata description logic, a second privilege level associated with the memory address, corresponding to the memory operation;
    determine, at the decision logic, whether the memory operation has access to the memory address using the first privilege level and the second privilege level;
    responsive to determining that the memory operation does not have access to the memory address:
        providing, via an output stream of a column decoder of the memory device, a data pattern to a host, wherein the data pattern identifies two or more types of faults corresponding to the comparing of the first privilege level and the second privilege level.

11. The apparatus of claim 10, wherein the memory access verification logic is further configured to, responsive to determining that the memory operation does not have access to the memory address, refrain from processing the memory operation.

12. The apparatus of claim 11, wherein the memory access verification logic is further configured to, responsive to determining that the memory operation does not have access to the memory address, issue an exception.

13. The apparatus of claim 11, wherein the memory access verification logic is further configured to, responsive to determining that the memory operation does not have access to the memory address, provide predetermined data corresponding to the command.

14. The apparatus of claim 13, wherein the predetermined data includes the data pattern identifying the memory operation as not having access to the memory address.

15. The apparatus of claim 10, wherein the command is part of a sequence of memory operation performed during a branch prediction.

16. A method comprising:
receiving a command at memory access verification logic incorporated in cache, wherein the command comprises a memory operation, a first privilege level, and a plurality of memory addresses;
determining whether the plurality of memory addresses are protected;
responsive to determining that the plurality of memory address are protected, identifying a second privilege level associated with the plurality of memory addresses of the cache, wherein the plurality of memory addresses is associated with the memory operation;
determining, using the first privilege level and the second privilege level, whether the memory operation has access to the plurality of memory addresses;
responsive to determining that the memory operations do not have access to the plurality of memory addresses:
providing, via an output stream of a column decoder of the memory device, a data pattern to a host, wherein the data pattern identifies two or more types of faults corresponding to a comparison of the first privilege level and the second privilege level.

17. The method of claim 16, wherein determining whether the plurality of memory addresses are protected further includes requesting a base address from a base module.

18. The method of claim 17, further comprising:
receiving the base address at decision logic; and
comparing the base address to the plurality of memory addresses.

19. The method of claim 18, further comprising determining whether the plurality of memory addresses is greater than the base address and are less than a bound address using a bound module.

20. The method of claim 19, further comprising:
responsive to determining that the plurality of memory addresses is greater than the base address and less than the bound address, determining that the address is protected; and
responsive to determining that the plurality of memory addresses is less than the base address or greater than the bound address, determining that the address is not protected.

* * * * *